United States Patent
Ye et al.

(10) Patent No.: US 10,804,509 B2
(45) Date of Patent: Oct. 13, 2020

(54) BATTERY-FIXING DEVICE AND ELECTRONIC DEVICE

(71) Applicant: JRD COMMUNICATION (SHENZHEN) LTD., Shenzhen, Guangdong (CN)

(72) Inventors: Benzhi Ye, Guangdong (CN); Huajun Cheng, Guangdong (CN); Zhiguo Ye, Guangdong (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 122 days.

(21) Appl. No.: 15/744,048

(22) PCT Filed: Apr. 20, 2017

(86) PCT No.: PCT/CN2017/081239
§ 371 (c)(1),
(2) Date: Jan. 11, 2018

(87) PCT Pub. No.: WO2018/133226
PCT Pub. Date: Jul. 26, 2018

(65) Prior Publication Data
US 2019/0006641 A1    Jan. 3, 2019

(30) Foreign Application Priority Data
Jan. 22, 2017    (CN) .................... 2017 2 0081193 U

(51) Int. Cl.
*H01M 2/10* (2006.01)
*H01M 2/02* (2006.01)
(Continued)

(52) U.S. Cl.
CPC ....... *H01M 2/1016* (2013.01); *H01M 2/1066* (2013.01); *H04M 1/0262* (2013.01); *H01M 2220/20* (2013.01)

(58) Field of Classification Search
CPC ............. H01M 2/10; H01M 2/12; H01M 2/08
See application file for complete search history.

(56) References Cited

U.S. PATENT DOCUMENTS

| | | | |
|---|---|---|---|
| 9,023,511 B1 * | 5/2015 | Chamberlain ...... | H01M 2/1066 429/163 |
| 2009/0158636 A1 * | 6/2009 | Rosario ................. | A01M 3/022 43/114 |

(Continued)

FOREIGN PATENT DOCUMENTS

| CN | 104810563 | 7/2015 |
|---|---|---|
| CN | 205069699 | 3/2016 |

(Continued)

OTHER PUBLICATIONS

Machine Translation of: Liu et al., CN 106299165 A, Jan. 4, 2017.*

(Continued)

*Primary Examiner* — Kenneth J Douyette

(57) ABSTRACT

The present disclosure provides a battery-fixing device and an electronic device, and the battery-fixing device is arranged in the electronic device and includes: a casing battery chamber, and a container fixedly arranged in the casing battery chamber and matched with the casing battery chamber to wrap and fix the battery. The container includes a containing chamber formed by a surround of a film and configured to contain a battery, and fixing films arranged on the containing chamber and connected to the containing chamber to fix the top of the containing chamber. Therefore, the battery-fixing device of the present disclosure uses the four-side wrapping PET film to fix the battery, thus the fixation thereof is more stable, the battery is easy to be detached, and not easy to be deformed or damaged, and it is safe and reliable.

12 Claims, 5 Drawing Sheets

(51) Int. Cl.
H01M 2/12 (2006.01)
H04M 1/02 (2006.01)

(56) References Cited

U.S. PATENT DOCUMENTS

| | | | |
|---|---|---|---|
| 2009/0274953 | A1 | 11/2009 | Myers et al. |
| 2011/0223447 | A1* | 9/2011 | Ignor ................. H01M 2/0207 429/7 |
| 2014/0128815 | A1* | 5/2014 | Cabiri ................. A61M 5/158 604/180 |
| 2016/0339672 | A1* | 11/2016 | Kagiyama ................. C09J 7/29 |

FOREIGN PATENT DOCUMENTS

| | | |
|---|---|---|
| CN | 205790099 | 12/2016 |
| CN | 106299165 | 1/2017 |
| WO | 2015182050 A1 | 12/2015 |

OTHER PUBLICATIONS

Search Report of counterpart European Patent Application No. 17825354.8 dated Jan. 17, 2020.

\* cited by examiner

BATTERY-FIXING DEVICE AND ELECTRONIC DEVICE

The present application is a 35 U.S.C. § 371 National Phase conversion of International (PCT) Patent Application No. PCT/CN2017/081239 filed Apr. 20, 2017, which claims foreign priority of Chinese Patent Application No. 201720081193.7, filed on Jan. 22, 2017 in the State Intellectual Property Office of China, the contents of all of which are hereby incorporated by reference.

BACKGROUND OF THE INVENTION

1. Field of the Invention

The present disclosure relates to the field of the technology for fixing battery, and more particularly to a battery-fixing device and an electronic device.

2. Discussion of the Related Art

Currently, the mobile phone is required to be thinner and thinner, and a lot of battery covers are disassemblable, thus it is very important to fix a soft-packed battery. Once the soft-packed battery is fixed unreliably, thus the battery is prone to fall and hit, and is prone to be damaged when detaching the battery, thereby resulting in the security incidents. Generally, the soft-packed battery is fixed by an easy-to-pull glue tape, which has two surfaces with glues respectively, one surface of the easy-to-pull glue tape is adhered on a casing (a metal steel sheet or a magnesium-aluminum alloy) of the mobile phone, and another opposite surface thereof is adhered on the battery, to fix the battery. The easy-to-pull glue tape has an appropriate slope, and when detaching the battery, the easy-to-pull glue tape is pulled obliquely to separate the battery from the casing. The easy-to-pull glue tape is a double-sided glue tape, thus even if the easy-to-pull glue tape is taken out with the battery, the battery is also prone to be deformed, which will cause the battery to be scrapped and cannot be used when detaching. What is worse, it is prone to operate improperly so that the battery explodes, thereby a big security risk exists.

Therefore, what is needed, is to provide a new battery-fixing device and a corresponding electronic device, to solve the above problems.

SUMMARY

The present disclosure relates to a battery-fixing device and an electronic device, to solve the problems of using the easy-to-pull glue tape to fix the soft-packed battery, which is prone to deform the battery so as to cause the battery to be scrapped and useless, and what is worse, is prone to operate improperly so as to cause the battery exploded and exist a big security risk.

A technical solution of the present disclosure is shown as follows:

A battery-fixing device, arranged in an electronic device, includes: a casing battery chamber, and a container fixedly arranged in the casing battery chamber and matched with the casing battery chamber to wrap and fix a battery;
the container comprises: a substrate film, a plurality of fixing films each extending from the substrate film, and a containing chamber formed by a surround of the substrate film and the fixing films and configured to contain the battery, wherein the fixing films are configured to fix a top of the battery;
when fixing the battery, the battery is put into the containing chamber, and then the fixing films are affixed to the top of the battery; and when taking out the battery, the fixing films are split from the top of the battery to detach the battery from the containing chamber;
the substrate film and the fixing films are integrally formed;
a bottom of the casing battery chamber comprises a flexible circuit board area and a non-flexible circuit board area, the non-flexible circuit board area is attached with a double-sided adhesive, and the container is fixed in the casing battery chamber via the double-sided adhesive attached on the non-flexible circuit board area.

A battery-fixing device, arranged in an electronic device, includes: a casing battery chamber, and a container fixedly arranged in the casing battery chamber and matched with the casing battery chamber to wrap and fix a battery; the container includes: a substrate film, a plurality of fixing films each extending from the substrate film, and a containing chamber formed by a surround of the substrate film and the fixing films and configured to contain the battery, wherein the fixing films are configured to fix a top of the battery; when fixing the battery, the battery is put into the containing chamber, and then the fixing films are affixed to the top of the battery; and when taking out the battery, the fixing films are split from the top of the battery to detach the battery from the containing chamber.

An electronic device includes the battery-fixed device as described in the above.

The present disclosure can achieve the advantages as follows: the present disclosure provides the battery-fixing device and the electronic device, and the battery-fixing device includes: the casing battery chamber, and the container fixedly arranged in the casing battery chamber and matched with the casing battery chamber to wrap and fix the battery. The container includes the containing chamber formed by the surround of the film and configured to contain the battery, and fixing films arranged on the containing chamber and connected to the containing chamber to fix the top of the battery. Therefore, the battery-fixing device of the present disclosure uses the four-side wrapping PET film to fix the battery, thus the fixation thereof is more stable, the battery is easy to be detached, and not easy to be deformed or damaged, and it is safe and reliable.

DETAILED DESCRIPTION OF THE EMBODIMENTS

The present disclosure relates to a battery-fixing device and an electronic device. The present disclosure will be described more fully hereinafter with reference to the accompanying drawings and the embodiments, to more clearly and accurately show the purpose, the technical solution and the result of the present disclosure. However, it should be understood that, the embodiments described herein are merely used to illustrate the present disclosure, and are not intended to limit the present disclosure.

The battery-fixing device of the present disclosure is assembled in the electronic device, and the electronic device includes, but is not limited to be, a mobile phone.

Figure 1:
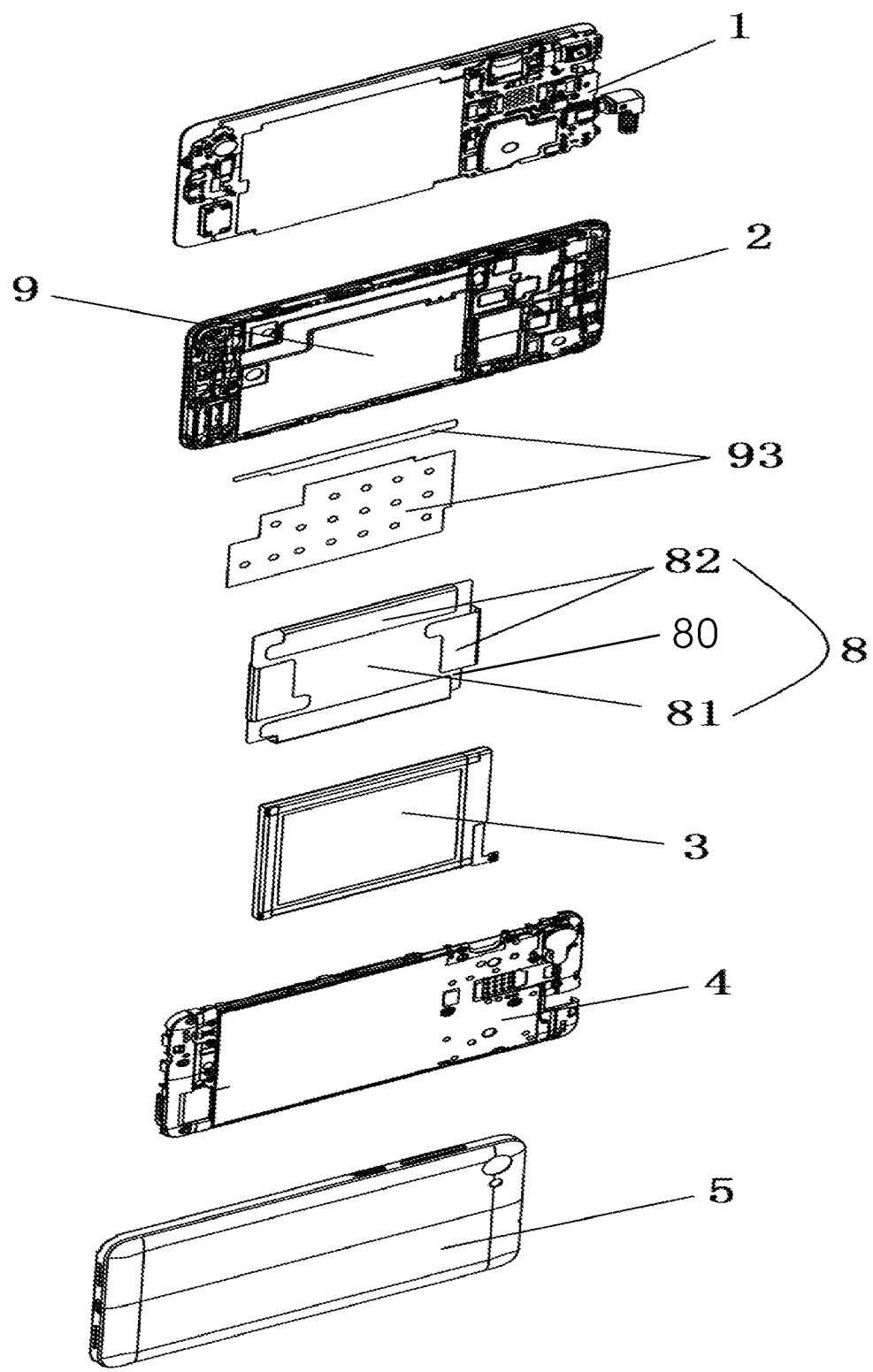
FIG. 1 is an schematic exploded view of a battery-fixing device in accordance with an embodiment of the present disclosure.

In the present embodiment, the electronic device is illustrated by an example of a mobile phone. As shown in FIG. 1, the mobile phone includes a PCBA main-board subassembly 1, a host front-case subassembly 2, a battery 3 (a soft-packed battery), a host back-case subassembly 4, and a battery cover subassembly 5. These subassemblies are well-known for those skilled in the art, and not relative to the purpose of the present disclosure, thus will not be described herein.

The mobile phone as shown in FIG. 1 is provided with the battery-fixing device of the present disclosure. The battery-fixing device includes a casing battery chamber 9 and a container 8 fixedly arranged in the casing battery chamber 9 and matched with the casing battery chamber 9 to wrap and fix the battery.

Figure 2:
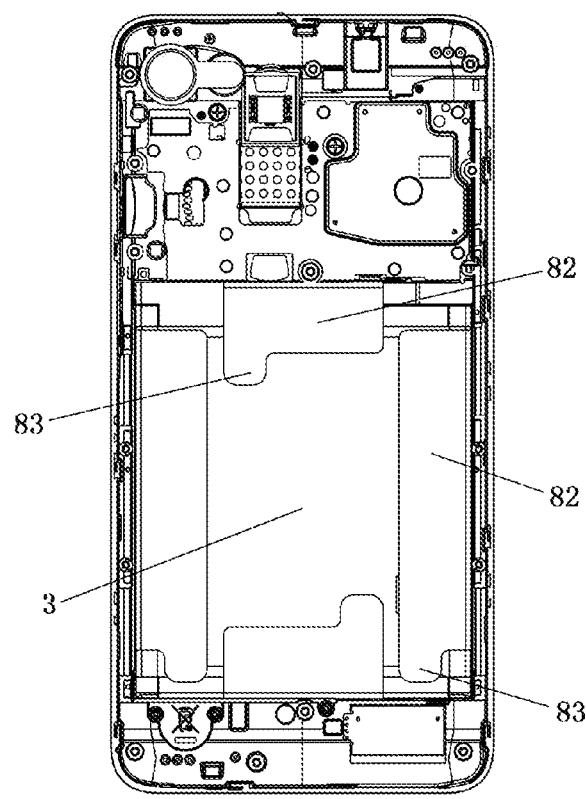
FIG. 2 is a schematic structural view of the battery-fixing device in an assembling state in accordance with an embodiment of the present disclosure.

Furthermore, as shown in FIGS. 1 and 2, the container 8 includes a substrate film 80, a plurality of fixing films 82 each extending from the substrate film 80, and a containing chamber 81 formed by a surround of the substrate film 80 and the fixing films 82 and configured to contain the battery 3, and the fixing films 82 are configured to fix a top of the battery 3. When fixing the battery 3, the battery 3 is put into the containing chamber 81, and then the fixing films 82 are adhered and fixed on the top of the battery 3; when taking out the battery 3, the fixing films 82 are split from the top of the battery 3, thus the battery 3 is detachable from the containing chamber 81.

In the present embodiment, the substrate film 80 is integrally formed with the fixing films 82, and the substrate film 80 and the fixing films 82 are both made of a PET film (a high-temperature resistant polyester film). That is, the container 8 is wholly formed by the surround of the PET film. The container of the present embodiment may be expanded in a plan as shown in FIG. 4.

Optionally, as shown in FIGS. 1 and 2, in the present embodiment, the substrate film 80 is rectangular-shaped such that the containing chamber 81 is also rectangular-shaped, the number of the fixing films 82 is 4, and each of the fixing films 82 has a splitting handle 83 arranged thereon and configured to conveniently split a corresponding one of the fixing films 82 from the top of the battery.

Figure 4:
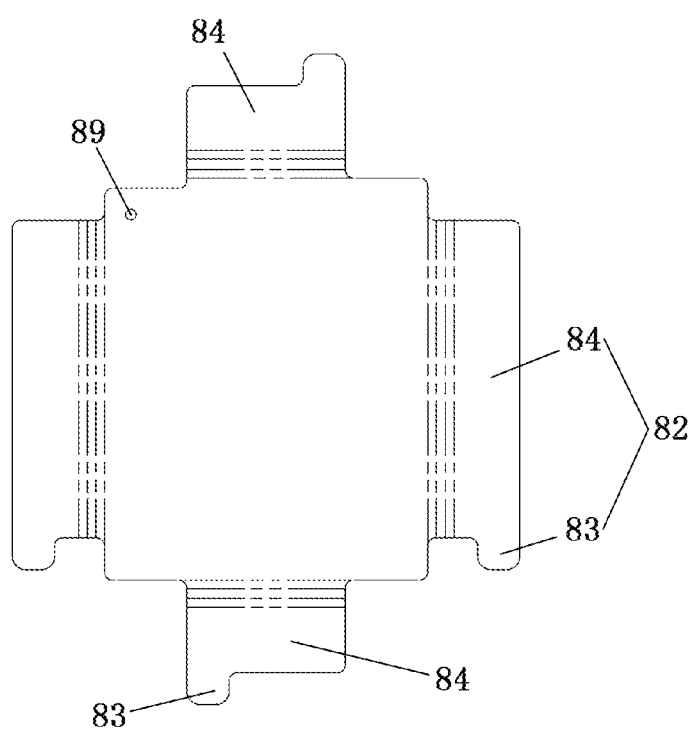
FIG. 4 is an expanded plan view of a containing chamber in accordance with an embodiment of the present disclosure.

Furthermore, as shown in FIG. 4, in the present embodiment, each of the fixing films 82 has an adhesive area 84 arranged thereon and configured to attach a double-sided adhesive, and each of the fixing films 82 is fixed on the top of the battery via the double-sided adhesive (the back adhesive) attached on the adhesive area 84. In the four fixing films as shown in FIG. 4, an upper fixing film is substantially same to a lower fixing film, the upper fixing film has a shape and a size same to those of the lower fixing film, and each of the splitting handles thereof is arranged at a side of each of the fixing films.

Furthermore, as shown in FIG. 4, in the present embodiment, at least one vent hole 89 is formed on a bottom of the container for permeating air.

Figure 5:
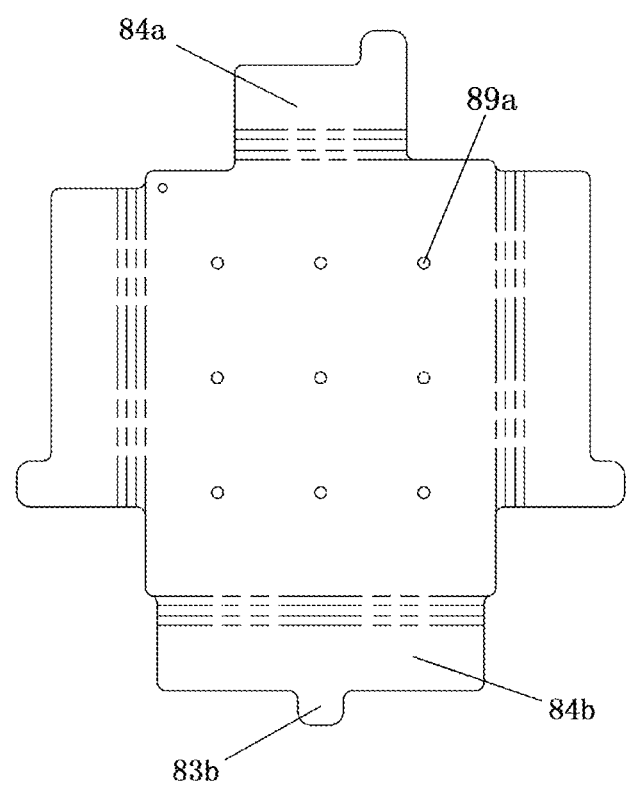
FIG. 5 is an expanded plan view of a containing chamber in accordance with another embodiment of the present disclosure.

It should be noted that, compared with the embodiment of FIG. 4, the fixing films as shown in FIG. 5 are substantially same to the fixing films as shown in FIG. 4 in the design principle; however, as shown in FIG. 5, a lower fixing film thereof is larger than an upper fixing film, and a lower splitting handle 83b of the lower fixing film is arranged at a middle of the lower fixing film. A lower adhesive area 84b is significantly larger than an upper adhesive area 84a, thus to enhance the fixation of the battery by the lower fixing film, since the mobile phone is commonly used in a vertical state and generates a larger force for the lower fixing film due to a gravity thereof. The splitting handle is arranged at the middle thereof, thus it is helpful to be forced evenly when splitting the fixing film and does not damage the battery. According to the above arrangement, the size of the lower adhesive area 84b is increased, and the lower splitting handle 83b is arranged at the middle thereof, thus it can further improve the protection of the soft-packed battery. In addition, compared with the container as shown in FIG. 4, the container as shown in FIG. 5 has more vent holes 89a, to further decrease the influence for the battery by the air pressure in the container, and also improve the heat-dissipating effect. It can be understood that, as shown in FIG. 5, a left fixing film and a right fixing film may be flexibly modified according to the change of the lower fixing film, to emphasize the modification of the lower fixing film.

As shown in FIGS. 1 and 4, in the present embodiment, the battery-fixing device is a four-side wrapping PET-film battery-fixing device, the container is a four-side wrapping PET film, and the four fixing films are four sides of the PET film. When assembling the four-side wrapping PET film, the four sides of the PET film are reflexed to adhere the four adhesive areas to the top of the battery, thus the fixing films are affixed on the top of the battery. Since no double-sided adhesive is attached on the middle of the front surface of the four-side wrapping PET film, that is, the bottom of the container is not attached with the double-sided adhesive, thus the PET film is not affixed with the bottom surface of the battery. When disassembling the PET film, the four splitting handle are used to split the four sides of the PET film from the top of the battery, thus the battery is easy to be manually detached without a sharp tool, such as tweezers, etc., and the battery will not be deformed or damaged.

Figure 3:
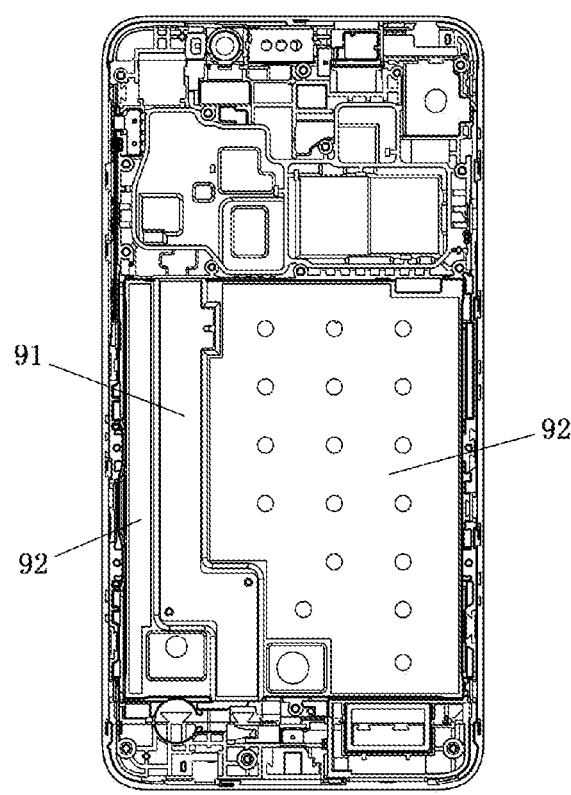
FIG. 3 is a schematic structural view of a casing battery chamber in accordance with an embodiment of the present disclosure.

Furthermore, as shown in FIGS. 1 and 3, the bottom of the casing battery chamber 9 includes a flexible circuit board area 91 and a non-flexible circuit board area 92. Since the back surface of the PET film is not attached with any double-sided adhesive, in the present embodiment, the non-flexible circuit board area 92 (the area without any flexible printed circuit) of the casing battery chamber is attached with the double-sided adhesive, to fix the PET film wrapping the battery in the casing battery chamber. That is, the non-flexible circuit board area 92 is attached with the double-sided adhesive 93, and the container 8 is affixed in the casing battery chamber 9 via the double-sided adhesive 93 attached on the non-flexible circuit board area 92.

Furthermore, in the present embodiment, the PET film has a thickness of 0.05 mm. In the present embodiment, the battery-fixing device is the four-side wrapping PET film for fixing the battery. Thus the influence for the thickness of the whole mobile phone generated by the battery-fixing device may be shown as follows: the thickness of the PET film (including the back adhesive) is 0.08 mm (that is, the thickness of the base substrate of the PET film being 0.05 mm plus the thickness of the back adhesive being 0.03 mm). The portion of the PET film under the bottom of the battery (that is, the substrate film 80 of the container 8 plus the double-sided adhesive attached on the non-flexible circuit board area 92 of the casing battery chamber 9) is 0.08 mm in thickness, and the reflexed portion of the PET film, which is attached on the top of the battery, (that is, each of the fixing films 82 of the container 8 plus the double-sided adhesive attached on each of the fixing films 82), is 0.08 mm in thickness. Therefore, when affixing the wrapped PET film, the total thickness of the battery is added with 0.08 mm+0.08 mm=0.16 mm. Since the actual thickness of the soft-packed battery is thinner than the standard specification thereof with a difference of 0.2~0.3 mm, thus the wrapped PET film will not influence the whole thickness of the mobile phone.

The battery-fixing device of the present disclosure uses the four-side wrapping PET film to fix the battery, thus it can achieve the advantages as follows: 1) the four sides of the PET film are attached with the back adhesive, and reflexed to be attached to the top of the battery, so as to fix the top of the battery; 2) the portion of the PET film under the bottom of the battery is not attached with any back adhesive, thus the battery is easy to be detached; 3) the back of the PET film is not attached with any double-sided adhesive, but the non-flexible circuit board area of the casing battery chamber is attached with the double-sided adhesive, thus the back of the PET film is affixed to the casing, so as to fix the battery to the casing. The manner by using the four-side wrapping PET film to fix the battery, makes the battery easily to be detached, and also makes the battery firmly fixed on the casing, thus the battery is not easy to move; that is, the detachment and the fixation of the battery are both good, and the state thereof in the actual dropping test is also good.

Therefore, the battery-fixing device of the present disclosure uses the four-side wrapping PET film to fix the battery, the fixation is stable, the battery is easy to be detached, and not easy to be deformed or damaged, thus it is safe and reliable.

The embodiment of the present invention further provides an electronic device, which includes the battery-fixing device as described in the above. The electronic device includes, but is not limited to be, a mobile phone.

In summary, the present disclosure provides the battery-fixing device and the electronic device, and the battery-fixing device includes: the casing battery chamber, and a container fixedly arranged in the casing battery chamber and matched with the casing battery chamber to wrap and fix the battery. The container includes the containing chamber formed by the surround of the film and configured to contain the battery, and the fixing films configured to fix the top of the battery, which are arranged on the containing chamber and connected to the containing chamber. Therefore, the battery-fixing device uses the four-side wrapping PET film to fix the battery, thus the fixation thereof is more stable, the battery is easy to be detached, and not easy to be deformed or damaged, and it is safe and reliable.

What is described above is merely the embodiments of the present disclosure, thus shouldn't be construed to be limiting the patentable scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A battery-fixing device, arranged in an electronic device, comprising: a casing battery chamber, and a container fixedly arranged in the casing battery chamber and matched with the casing battery chamber to wrap and fix a battery;
    wherein the container comprises: a substrate film, a plurality of fixing films each extending from the substrate film, and a containing chamber formed by a surround of the substrate film and the fixing films and configured to contain the battery, wherein the fixing films are configured to fix a top of the battery;
    when fixing the battery, the battery is put into the containing chamber, and then the fixing films are affixed to the top of the battery; and when taking out the battery, the fixing films are split from the top of the battery to detach the battery from the containing chamber;
    the substrate film comprises a plurality of sides having a one-to-one correspondence with the fixing films, each of the fixing films extends from a corresponding side of the substrate film;
    each of the fixing films comprises a splitting handle configured to split a corresponding one of the fixing films from the top of the battery;
    a lower fixing film is larger than an upper fixing film, and a lower splitting handle of the lower fixing film is arranged at a middle of the lower fixing film along a length direction of the lower fixing film.

2. The battery-fixing device as claimed in claim 1, wherein the substrate film and the fixing films are integrally formed.

3. The battery-fixing device as claimed in claim 1, wherein the substrate film and the fixing films are made of a PET film.

4. The battery-fixing device as claimed in claim 3, wherein the PET film has a thickness of 0.05 mm.

5. The battery-fixing device as claimed in claim 1, wherein the containing chamber is rectangular-shaped.

6. The battery-fixing device as claimed in claim 1, wherein the number of the fixing films is four.

7. The battery-fixing device as claimed in claim 1, wherein each of the fixing films comprises an adhesive area configured to be attached with a double-sided adhesive, and each of the fixing films is fixed on the top of the battery via the double-sided adhesive attached on the adhesive area.

8. The battery-fixing device as claimed in claim 1, wherein a bottom of the casing battery chamber comprises a flexible circuit board area and a non-flexible circuit board area, the non-flexible circuit board area is attached with a double-sided adhesive, and the container is fixed in the casing battery chamber via the double-sided adhesive attached on the non-flexible circuit board area.

9. The battery-fixing device as claimed in claim 1, when the battery is fixed, each surface of the battery is covered by the container.

10. The battery-fixing device as claimed in claim 1, wherein the substrate film defines at least one vent hole for permeating air.

11. The battery-fixing device as claimed in claim 6, the substrate film is in a shape of rectangular and comprises four sides.

12. The battery-fixing device as claimed in claim 11, when the battery is fixed, each splitting handle is spaced apart from each of the four sides of the substrate film.

* * * * *